United States Patent
Kim

(10) Patent No.: US 12,279,305 B2
(45) Date of Patent: Apr. 15, 2025

(54) METHOD AND APPARATUS FOR RANDOM ACCESS IN REPETITION MODE IN WIRELESS MOBILE COMMUNICATION SYSTEM

(71) Applicants: BLACKPIN Inc., Seoul (KR);
Soenghun Kim, Hanam-si (KR);
SIGNALIS CO., LTD., Daejeon (KR)

(72) Inventor: Soenghun Kim, Hanam-si (KR)

(73) Assignees: Soenghun Kim, Hanam-si (KR);
BLACKPIN INC., Seoul (KR);
SIGNALIS CO., LTD., Daejeon (KR)

( * ) Notice: Subject to any disclaimer, the term of this patent is extended or adjusted under 35 U.S.C. 154(b) by 0 days.

(21) Appl. No.: 18/653,985

(22) Filed: May 3, 2024

(65) Prior Publication Data
US 2024/0306191 A1    Sep. 12, 2024

Related U.S. Application Data

(63) Continuation of application No. PCT/KR2022/017314, filed on Nov. 7, 2022.

(30) Foreign Application Priority Data

Nov. 16, 2021 (KR) .................. 10-2021-0157907

(51) Int. Cl.
*H04W 74/00* (2009.01)
*H04W 48/08* (2009.01)
*H04W 74/0833* (2024.01)

(52) U.S. Cl.
CPC ......... *H04W 74/006* (2013.01); *H04W 48/08* (2013.01); *H04W 74/0833* (2013.01)

(58) Field of Classification Search
CPC ............. H04W 74/006; H04W 48/08; H04W 74/0833
See application file for complete search history.

(56) References Cited

U.S. PATENT DOCUMENTS

2020/0015236 A1*  1/2020  Kung .................. H04B 17/318
2020/0396764 A1* 12/2020  Lin .................... H04W 74/006
(Continued)

FOREIGN PATENT DOCUMENTS

KR    1020180035644 A    4/2018
KR    1020190036552 A    4/2019
(Continued)

OTHER PUBLICATIONS

ZTE Corporation et al., "Consideration on Msg3 repetition in CE," 3GPP TSG-RAN WG2 Meeting #116e, e-meeting, R2-2109894, Nov. 1-12, 2021.
(Continued)

*Primary Examiner* — Siren Wei
(74) *Attorney, Agent, or Firm* — PnK IP LLC

(57) ABSTRACT

A method and apparatus for random access in repetition mode is provided. Method for random access in repetition mode includes receiving first RACH configuration, second RACH configuration and PDCCH configuration, selecting an uplink on which to perform a random access procedure based on the first rsrp threshold in the first RACH configuration, transmitting a preamble in the next available PRACH occasion based on PRACH configuration index, monitoring PDCCH in search space indicated by random access search space during while random access window is running, receiving a random access response message including a preamble identifier related to the preamble transmission and transmitting Msg3 based on the time domain resource allocation field in the uplink grant in the random access response.

17 Claims, 9 Drawing Sheets

(56) References Cited

U.S. PATENT DOCUMENTS

| | | | | |
|---|---|---|---|---|
| 2021/0014010 | A1* | 1/2021 | Babaei | H04W 72/0446 |
| 2021/0144742 | A1* | 5/2021 | Jeon | H04W 74/0833 |
| 2021/0219347 | A1 | 7/2021 | Ou et al. | |
| 2021/0360660 | A1* | 11/2021 | Cozzo | H04L 1/1887 |
| 2022/0377799 | A1* | 11/2022 | MolavianJazi | H04W 52/42 |
| 2022/0385381 | A1* | 12/2022 | MolavianJazi | H04W 72/54 |
| 2023/0062577 | A1* | 3/2023 | Rudolf | H04W 74/002 |

FOREIGN PATENT DOCUMENTS

| | | |
|---|---|---|
| KR | 1020190138901 A | 12/2019 |
| KR | 1020200131089 A | 11/2020 |
| KR | 1020210006145 A | 1/2021 |
| KR | 1020210011282 A | 2/2021 |

OTHER PUBLICATIONS

Huawei et al., "Further discussions on RAN2 support of Msg3 PUSCH repetition," 3GPP TSG-RAN WG2 Meeting #116-e, Online, R2-2111026, Nov. 1-12, 2021.

ZTE Corporation, "[AT116-e][112][CovEnh] Coverage enhancements aspects (ZTE)," 3GPP TSG-RAN WG2 Meeting #116-e, Online, R2-2111346, Nov. 1-12, 2021.

Vivo, "Further Discussion on RAN2 Impacts of Msg3 Repetition," 3GPP TSG-RAN WG2 Meeting #116-electronic, Online, R2-2109443, Nov. 1-12, 2021.

Qualcomm Inc, "RAN2 aspects of coverage enhancements," 3GPP TSG-RAN WG2 Meeting #116-e, Online, R2-2109456, Nov. 1-12, 2021.

Intel Corporation, "RAN2 aspects of Msg3 PUSCH repetition," 3GPP TSG-RAN WG2 Meeting #116e, E-Meeting, R2-2109877, Nov. 1-12, 2021.

Apple, "RAN2 impact of coverage enhancements," 3GPP TSG-RAN WG2 Meeting #116e, E-Meeting, R2-2110038, Nov. 1-12, 2021.

CATT, "Analysis on Type A PUSCH repetitions for Msg3," 3GPP TSG-RAN WG2 Meeting #116 electronic, Online, R2-2110440, Nov. 1-12, 2021.

Ericsson, "On Type A PUSCH repetitions for Msg3," 3GPP TSG-RAN WG2 Meeting #116-e, Electronic meeting, Tdoc R2-2110833, Nov. 1-12, 2021.

3GPP TS 38.331 V16.6.0 (Sep. 2021); Technical Specification; 3rd Generation Partnership Project; Technical Specification Group Radio Access Network; NR; Radio Resource Control (RRC) protocol specification(Release 16).

3GPP TS 38.213 V16.7.0 (Sep. 2021); Technical Specification; 3rd Generation Partnership Project; Technical Specification Group Radio Access Network; NR; Physical layer procedures for control (Release 16).

3GPP TS 38.321 V16.6.0 (Sep. 2021); Technical Specification; 3rd Generation Partnership Project; Technical Specification Group Radio Access Network; NR; Medium Access Control (MAC) protocol specification (Release 16).

International Search Report for International Patent Application No. PCT/KR2022/017314, dated Feb. 10, 2023.

CATT, "Discussion on Type A PUSCH repetitions for Msg3," 3GPP TSG RAN WG1 #104b-e, e-Meeting, R1-2102646, Apr. 12-20, 2021.

3GPP TS 38.321 V16.2.1 (Sep. 2020); Technical Specification; 3rd Generation Partnership Project;Technical Specification Group Radio Access Network; NR; Medium Access Control (MAC) protocol specification; (Release 16).

Ericsson, "Text Proposal for L1 parametrs for 38.331," 3GPP TSG-RAN WG2 #99bis, Prague, Czech Republic, Tdoc R2-1711524, Oct. 9-13, 2017.

3rd Generation Partnership Project; Technical Specification Group Radio Access Network; NR; Radio Resource Control (RRC) protocol specification (Release 15), 3GPP TS 38.331 V15.1.0, Mar. 2018.

* cited by examiner

METHOD AND APPARATUS FOR RANDOM ACCESS IN REPETITION MODE IN WIRELESS MOBILE COMMUNICATION SYSTEM

This application is a continuation of International Application No. PCT/KR2022/017314, filed on Nov. 7, 2022, which claims priority to and the benefit of Korean Patent Application No. 10-2021-0157907, filed on Nov. 16, 2021, the disclosure of which is incorporated herein by reference in its entirety.

BACKGROUND

Technical Field

The present disclosure relates to random access in repetition mode in wireless mobile communication system.

RELATED ART

To meet the increasing demand for wireless data traffic since the commercialization of 4th generation (4G) communication systems, the 5th generation (5G) system is being developed. For the sake of high data rate, 5G system introduced millimeter wave (mmW) frequency bands (e. g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency. Since high frequency band is utilized for 5G radio, uplink coverage problem can occur. To mitigate the uplink coverage problem, enhancements are required.

SUMMARY

Aspects of the present disclosure are to address the problems of uplink coverage problem. The method includes receiving first RACH configuration, second RACH configuration and PDCCH configuration, selecting an uplink on which to perform a random access procedure based on the first rsrp threshold in the first RACH configuration, transmitting a preamble in the next available PRACH occasion based on PRACH configuration index, monitoring PDCCH in search space indicated by random access search space during while random access window is running, receiving a random access response message including a preamble identifier related to the preamble transmission and transmitting Msg3 based on the time domain resource allocation field in the uplink grant in the random access response.

DETAILED DESCRIPTION

Figure 1A:
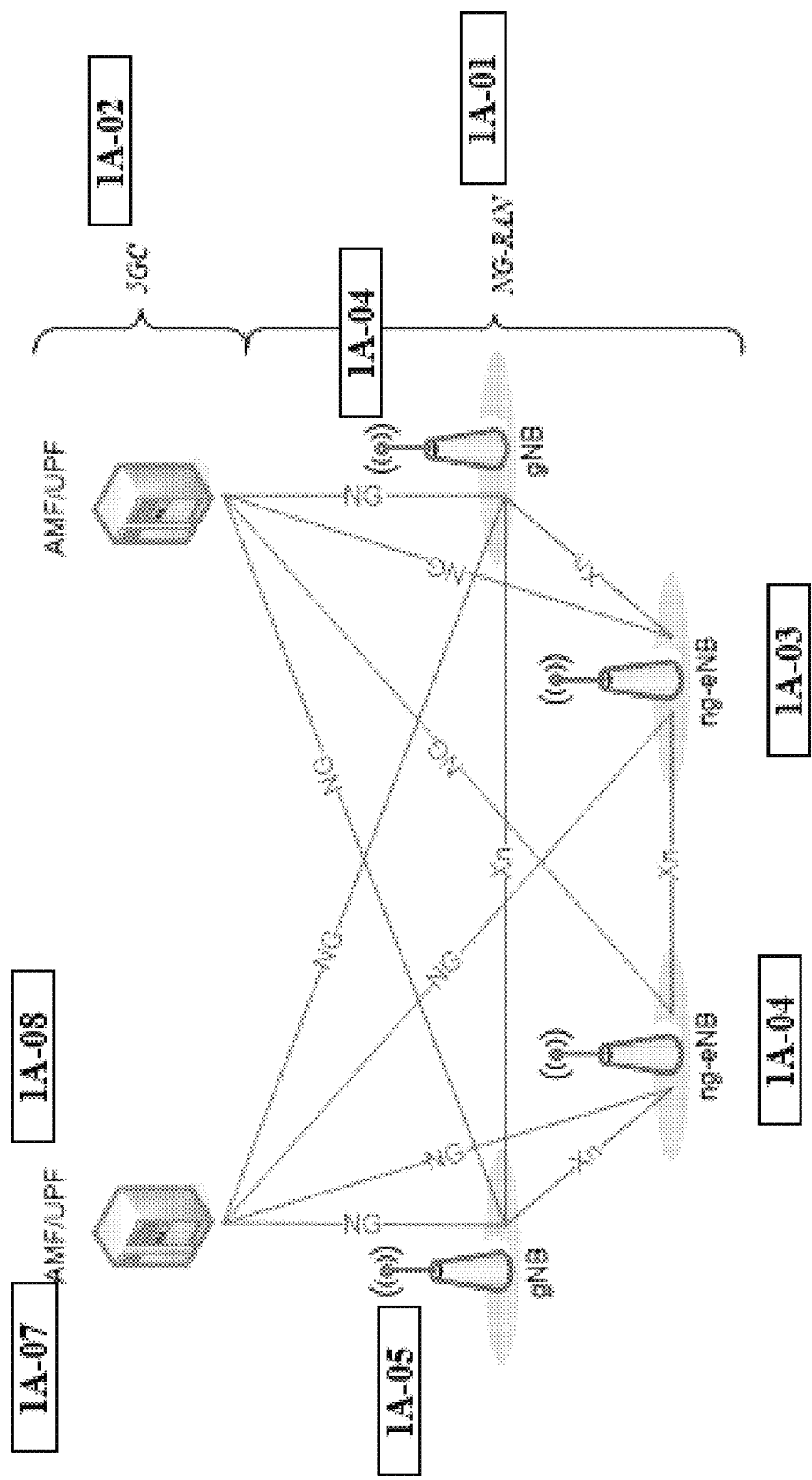
FIG. 1A is a diagram illustrating the architecture of an 5G system and a NG-RAN to which the disclosure may be applied.

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the latest 3GPP standards are used for convenience of explanation. However, the present disclosure is not limited by use of these terms and definitions and other arbitrary terms and definitions May be employed instead.

Table 1 lists the acronyms used throughout the present disclosure.

TABLE 1

| Acronym | Full name |
| --- | --- |
| 5GC | 5G Core Network |
| ACK | Acknowledgement |
| AM | Acknowledged Mode |
| AMF | Access and Mobility Management Function |
| ARQ | Automatic Repeat Request |
| AS | Access Stratum |
| ASN.1 | Abstract Syntax Notation One |
| BSR | Buffer Status Report |
| BWP | Bandwidth Part |
| CA | Carrier Aggregation |
| CAG | Closed Access Group |
| CG | Cell Group |
| C-RNTI | Cell RNTI |
| CSI | Channel State Information |
| DCI | Downlink Control Information |
| DRB | (user) Data Radio Bearer |
| DRX | Discontinuous Reception |
| HARQ | Hybrid Automatic Repeat Request |
| IE | Information element |
| LCG | Logical Channel Group |
| MAC | Medium Access Control |
| MIB | Master Information Block |

TABLE 1-continued

| Acronym | Full name |
| --- | --- |
| NAS | Non-Access Stratum |
| NG-RAN | NG Radio Access Network |
| NR | NR Radio Access |
| PBR | Prioritised Bit Rate |
| PCell | Primary Cell |
| PCI | Physical Cell Identifier |
| PDCCH | Physical Downlink Control Channel |
| PDCP | Packet Data Convergence Protocol |
| PDSCH | Physical Downlink Shared Channel |
| PDU | Protocol Data Unit |
| PHR | Power Headroom Report |
| PLMN | Public Land Mobile Network |
| PRACH | Physical Random Access Channel |
| PRB | Physical Resource Block |
| PSS | Primary Synchronisation Signal |
| PUCCH | Physical Uplink Control Channel |
| PUSCH | Physical Uplink Shared Channel |
| RACH | Random Access Channel |
| RAN | Radio Access Network |
| RA-RNTI | Random Access RNTI |
| RAT | Radio Access Technology |
| RB | Radio Bearer |
| RLC | Radio Link Control |
| RNA | RAN-based Notification Area |
| RNAU | RAN-based Notification Area Update |
| RNTI | Radio Network Temporary Identifier |
| RRC | Radio Resource Control |
| RRM | Radio Resource Management |
| RSRP | Reference Signal Received Power |
| RSRQ | Reference Signal Received Quality |
| RSSI | Received Signal Strength Indicator |
| SCell | Secondary Cell |
| SCS | Subcarrier Spacing |
| SDAP | Service Data Adaptation Protocol |
| SDU | Service Data Unit |
| SFN | System Frame Number |
| S-GW | Serving Gateway |
| SI | System Information |
| SIB | System Information Block |
| SpCell | Special Cell |
| SRB | Signalling Radio Bearer |
| SRS | Sounding Reference Signal |
| SSB | SS/PBCH block |
| SSS | Secondary Synchronisation Signal |
| SUL | Supplementary Uplink |
| TM | Transparent Mode |
| UCI | Uplink Control Information |
| UE | User Equipment |
| UM | Unacknowledged Mode |
| CRP | Cell Reselection Priority |

Table 2 lists the terminologies and their definition used throughout the present disclosure.

TABLE 2

| Terminology | Definition |
| --- | --- |
| Allowed CG-List | List of configured grants for the corresponding logical channel. This restriction applies only when the UL grant is a configured grant. If present, UL MAC SDUs from this logical channel can only be mapped to the indicated configured grant configuration. If the size of the sequence is zero, then UL MAC SDUs from this logical channel cannot be mapped to any configured grant configurations. If the field is not present, UL MAC SDUs from this logical channel can be mapped to any configured grant configurations. |
| Allowed SCS-List | List of allowed sub-carrier spacings for the corresponding logical channel. If present, UL MAC SDUs from this logical channel can only be mapped to the indicated numerology. Otherwise, UL MAC SDUs from this logical channel can be mapped to any configured numerology. |
| Allowed Serving Cells | List of allowed serving cells for the corresponding logical channel. If present, UL MAC SDUs from this logical channel can only be mapped to the serving cells indicated in this list. Otherwise, UL MAC SDUs from this logical channel can be mapped to any configured serving cell of this cell group. |
| Carrier frequency | center frequency of the cell. |
| Cell | combination of downlink and optionally uplink resources. The linking between the carrier frequency of the downlink resources and the carrier frequency of the uplink resources is indicated in the system information transmitted on the downlink resources. |
| Cell Group | in dual connectivity, a group of serving cells associated with either the MeNB or the SeNB. |
| Cell reselection | A process to find a better suitable cell than the current serving cell based on the system information received in the current serving cell |
| Cell selection | A process to find a suitable cell either blindly or based on the stored information |
| Dedicated signalling | Signalling sent on DCCH logical channel between the network and a single UE. |
| Discard Timer | Timer to control the discard of a PDCP SDU. Starting when the SDU arrives. Upon expiry, the SDU is discarded. |
| F | The Format field in MAC subheader indicates the size of the Length field. |
| Field | The individual contents of an information element are referred to as fields. |
| Frequency layer | set of cells with the same carrier frequency. |
| Global cell identity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |

TABLE 2-continued

| Terminology | Definition |
|---|---|
| Handover | procedure that changes the serving cell of a UE in RRC_CONNECTED. |
| Information element | A structural element containing single or multiple fields is referred as information element. |
| L | The Length field in MAC subheader indicates the length of the corresponding MAC SDU or of the corresponding MAC CE |
| LCID | 6 bit logical channel identity in MAC subheader to denote which logical channel traffic or which MAC CE is included in the MAC subPDU |
| MAC-I | Message Authentication Code - Integrity. 16 bit or 32 bit bit string calculated by NR Integrity Algorithm based on the security key and various fresh inputs |
| Logical channel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |
| LogicalChannelConfig | The IE LogicalChannelConfig is used to configure the logical channel parameters. It includes priority, prioritisedBitRate, allowedServingCells, allowedSCS-List, maxPUSCH-Duration, logicalChannelGroup, allowedCG-List etc |
| logicalChannelGroup | ID of the logical channel group, as specified in TS 38.321, which the logical channel belongs to |
| MAC CE | Control Element generated by a MAC entity. Multiple types of MAC CEs are defined, each of which is indicated by corresponding LCID. A MAC CE and a corresponding MAC sub-header comprises MAC subPDU |
| Master Cell Group | in MR-DC, a group of serving cells associated with the Master Node, comprising of the SpCell (PCell) and optionally one or more SCells. |
| maxPUSCH-Duration | Restriction on PUSCH-duration for the corresponding logical channel. If present, UL MAC SDUs from this logical channel can only be transmitted using uplink grants that result in a PUSCH duration shorter than or equal to the duration indicated by this field. Otherwise, UL MAC SDUs from this logical channel can be transmitted using an uplink grant resulting in any PUSCH duration. |
| NR | NR radio access |
| PCell | SpCell of a master cell group. |
| PDCP entity reestablishment | The process triggered upon upper layer request. It includes the initialization of state variables, reset of header compression and manipulating of stored PDCP SDUs and PDCP PDUs. The details can be found in 5.1.2 of 38.323 |
| PDCP suspend | The process triggered upon upper layer request. When triggered, transmitting PDCP entity set TX_NEXT to the initial value and discard all stored PDCP PDUs. The receiving entity stop and reset t-Reordering, deliver all stored PDCP SDUs to the upper layer and set RX_NEXT and RX_DELIV to the initial value |
| PDCP-config | The IE PDCP-Config is used to set the configurable PDCP parameters for signalling and data radio bearers. For a data radio bearer, discardTimer, pdcp-SN-Size, header compression parameters, t-Reordering and whether integrity protection is enabled are configured. For a signaling radio bearer, t-Reordering can be configured |
| PLMN ID Check | the process that checks whether a PLMN ID is the RPLMN identity or an EPLMN identity of the UE. |
| Primary Cell | The MCG cell, operating on the primary frequency, in which the UE either performs the initial connection establishment procedure or initiates the connection re-establishment procedure. |
| Primary SCG Cell | For dual connectivity operation, the SCG cell in which the UE performs random access when performing the Reconfiguration with Sync procedure. |
| priority | Logical channel priority, as specified in TS 38.321. an integer between 0 and 7. 0 means the highest priority and 7 means the lowest priority |
| PUCCH SCell | a Secondary Cell configured with PUCCH. |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| RX_DELIV | This state variable indicates the COUNT value of the first PDCP SDU not delivered to the upper layers, but still waited for. |
| RX_NEXT | This state variable indicates the COUNT value of the next PDCP SDU expected to be received. |
| RX_REORD | This state variable indicates the COUNT value following the COUNT value associated with the PDCP Data PDU which triggered t-Reordering. |
| Serving Cell | For a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. |
| SpCell | primary cell of a master or secondary cell group. |
| Special Cell | For Dual Connectivity operation the term Special Cell refers to the PCell of the MCG or the PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |
| SRB0 | SRB0 is for RRC messages using the CCCH logical channel |
| SRB1 | SRB1 is for RRC messages (which may include a piggybacked NAS message) as well as for NAS messages prior to the establishment of SRB2, all using DCCH logical channel; |

TABLE 2-continued

| Terminology | Definition |
| --- | --- |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |
| Suitable cell | A cell on which a UE may camp. Following criteria apply<br>The cell is part of either the selected PLMN or the registered PLMN or PLMN of the Equivalent PLMN list<br>The cell is not barred<br>The cell is part of at least one TA that is not part of the list of "Forbidden Tracking Areas for Roaming" (TS 22.011 [18]), which belongs to a PLMN that fulfils the first bullet above.<br>The cell selection criterion S is fulfilled (i.e. RSRP and RSRQ are better than specific values |
| t-Reordering | Timer to control the reordering operation of received PDCP packets. Upon expiry, PDCP packets are processed and delivered to the upper layers. |
| TX_NEXT | This state variable indicates the COUNT value of the next PDCP SDU to be transmitted. |
| UE Inactive AS Context | UE Inactive AS Context is stored when the connection is suspended and restored when the connection is resumed. It includes information below.<br>the current KgNB and KRRCint keys, the ROHC state, the stored QoS flow to DRB mapping rules, the C-RNTI used in the source PCell, the cellIdentity and the physical cell identity of the source PCell, the spCellConfigCommon within Reconfiguration WithSync of the NR PSCell (if configured) and all other parameters configured except for:<br>parameters within ReconfigurationWithSync of the PCell;<br>parameters within ReconfigurationWithSync of the NR PSCell, if configured;<br>parameters within MobilityControlInfoSCG of the E-UTRA PSCell, if configured;<br>servingCellConfigCommonSIB; |

In the present invention, "trigger" or "triggered" and "initiate" or "initiated" may be used in the same meaning.

In the present invention, "radio bearers allowed for the second resume procedure", "radio bearers for which the second resume procedure is set", and "radio bearers for which the second resume procedure is enabled" may all have the same meaning. 6 FIG. 1A is a diagram illustrating the architecture of an 5G system and a NG-RAN to which the disclosure may be applied.

5G system consists of NG-RAN 1A-01 and 5GC 1A-02. An NG-RAN node is either:

a gNB, providing NR user plane and control plane protocol terminations towards the UE; or an ng-eNB, providing E-UTRA user plane and control plane protocol terminations towards the UE.

The gNBs 1A-05 or 1A-06 and ng-eNBs 1A-03 or 1A-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the functions listed below.

Functions for Radio Resource Management such as Radio Bearer Control, Radio Admission Control, Connection Mobility Control, Dynamic allocation of resources to UEs in uplink, downlink and sidelink(scheduling); and IP and Ethernet header compression, uplink data decompression and encryption of user data stream; and Selection of an AMF at UE attachment when no routing to an MME can be determined from the information provided by the UE; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QoS handling and the downlink, mobility anchoring for mobility etc.

Figure 1B:
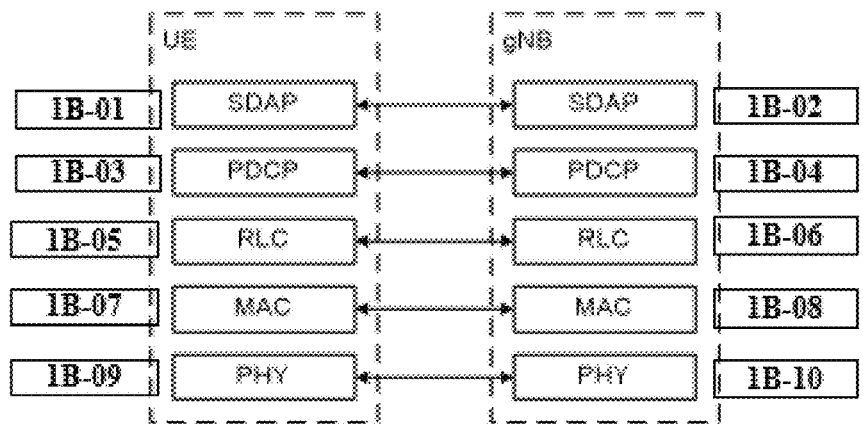
FIG. 1B is a diagram illustrating a wireless protocol architecture in an 5G system to which the disclosure may be applied.
Figure 1B:
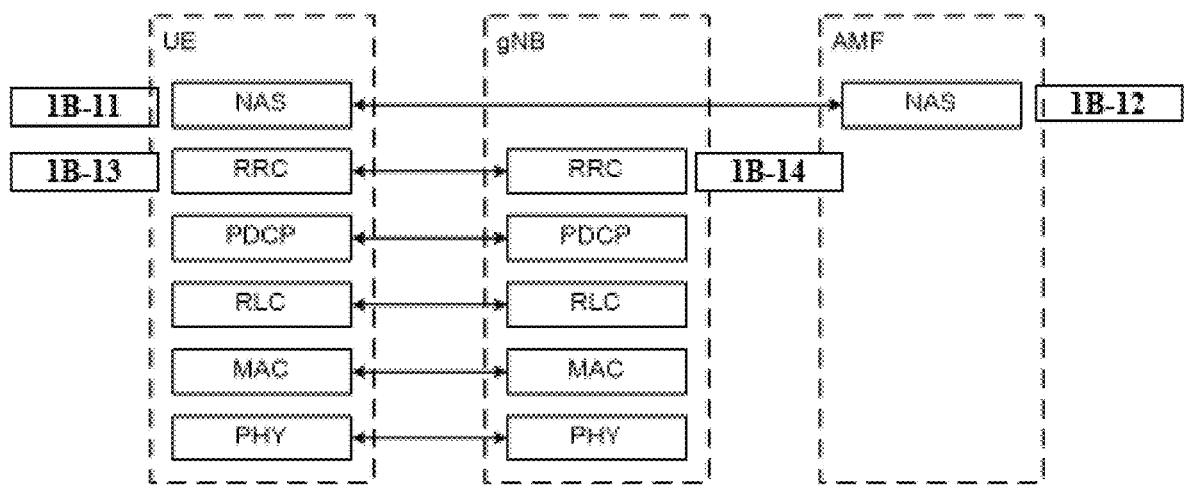

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed in the table 3.

TABLE 3

| Sublayer | Functions |
|---|---|
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

Figure 2A:
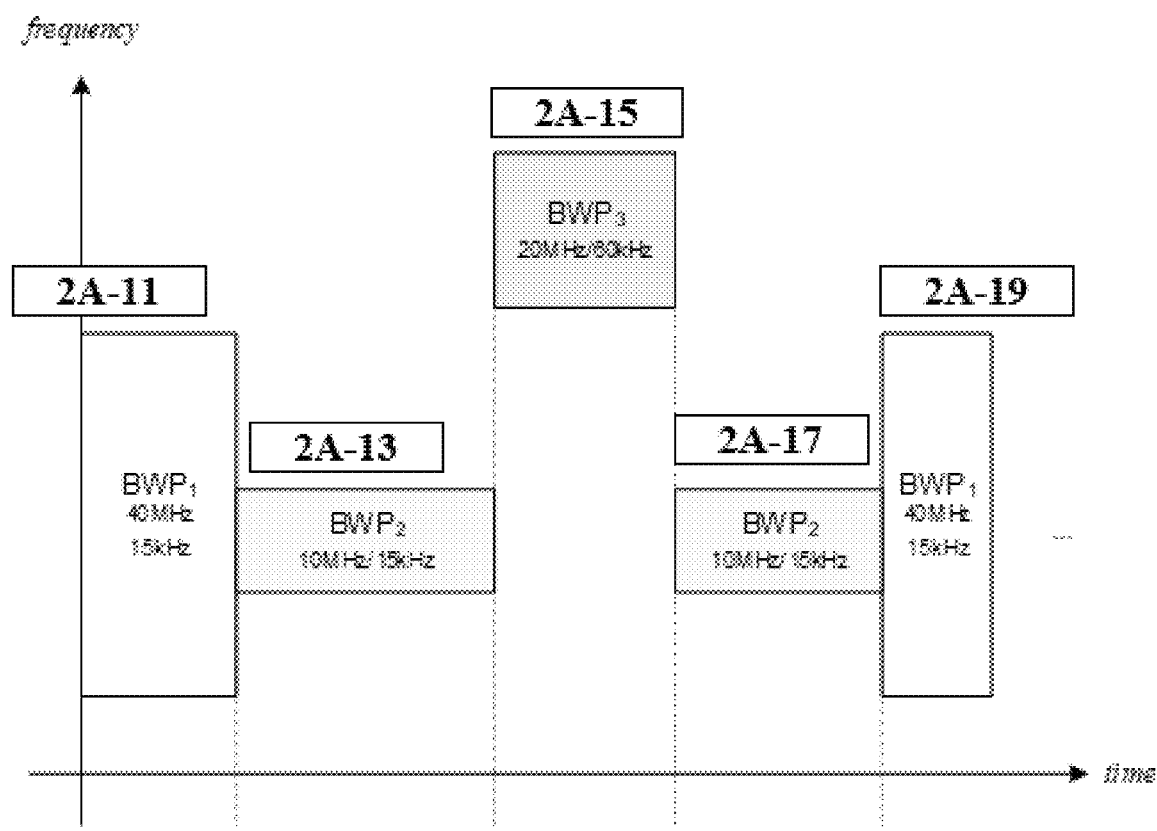
FIG. 2A is a diagram illustrating an example of a bandwidth part.

FIG. 2A is a diagram illustrating an example of a bandwidth part.

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.

FIG. 2A describes a scenario where 3 different BWPs are configured:

BWP1 with a width of 40 MHz and subcarrier spacing of 15 kHz; 2A-11 or 2A-19

BWP2 with a width of 10 MHz and subcarrier spacing of 15 kHz; 2A-13 or 2A-17

BWP3 with a width of 20 MHz and subcarrier spacing of 60 kHz. 2A-15

Figure 2B:
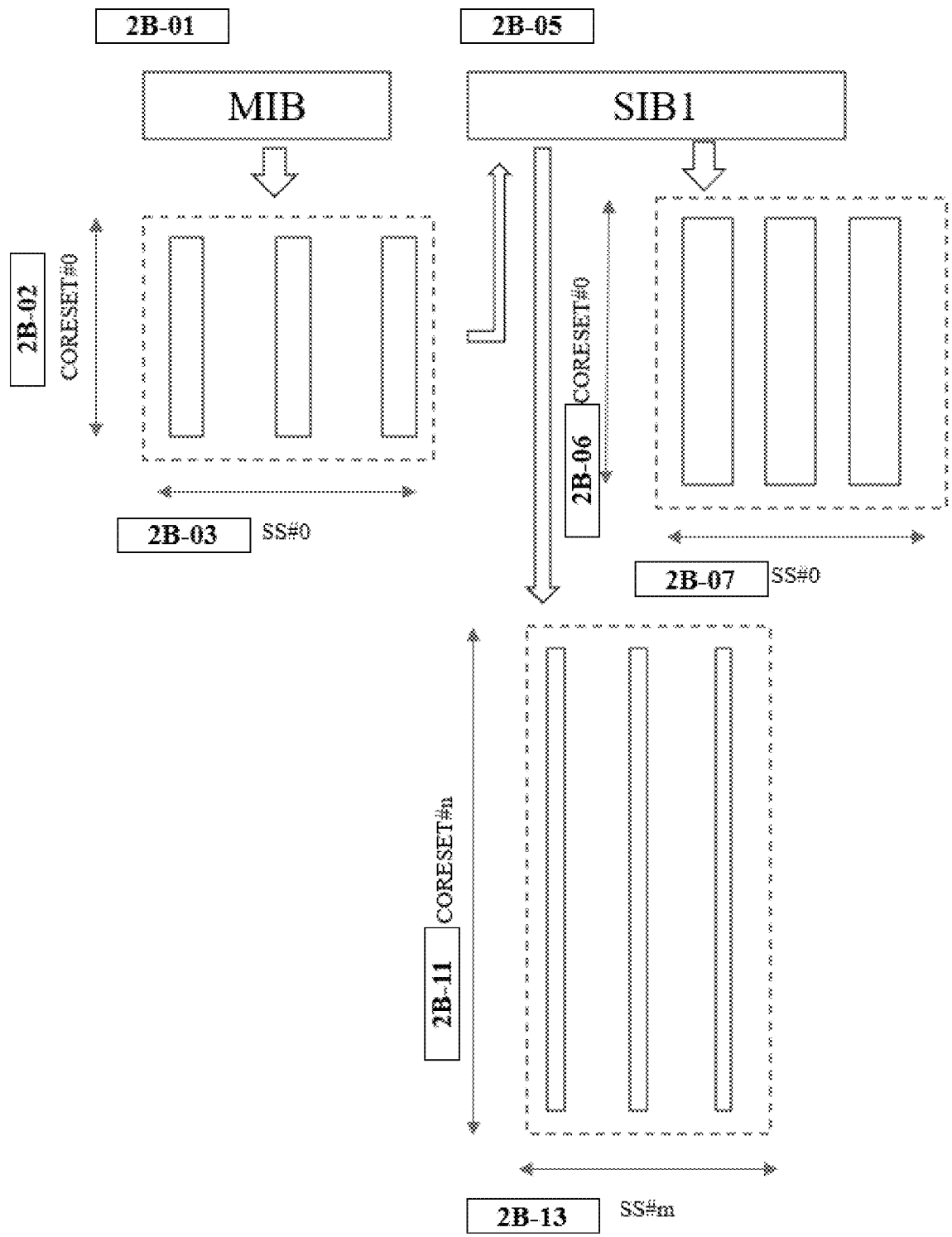
FIG. 2B is a diagram illustrating an example of a search space and a control resource set.

FIG. 2B is a diagram illustrating an example of a search space and a control resource set.

A plurality of SSs may be configured in one BWP. The UE monitors PDCCH candidates according to the SS configuration of the currently activated BWP. One SS consists of an SS identifier, a CORESET identifier indicating the associated CORESET, the period and offset of the slot to be monitored, the slot unit duration, the symbol to be monitored in the slot, the SS type, and the like. The information may be explicitly and individually configured or may be configured by a predetermined index related to predetermined values.

One CORESET consists of a CORESET identifier, frequency domain resource information, symbol unit duration, TCI status information, and the like.

Basically, it can be understood that CORESET provides frequency domain information to be monitored by the UE, and SS provides time domain information to be monitored by the UE.

CORESET #0 and SS #0 may be configured in the IBWP. One CORESET and a plurality of SSs may be additionally configured in the IBWP. Upon receiving the MIB 2B-01, the UE recognizes CORESET #0 2B-02 and SS #0 2B-03 for receiving SIB1 using predetermined information included in the MIB. The UE receives SIB1 2B-05 through CORESET #0 2B-02 and SS #0 2B-03. In SIB1, information constituting CORESET #0 2B- and SS #0 2B-07 and information constituting another CORESET, for example, CORESET #n 2B-11 and SS #m 2B-13 may be included.

The terminal receives necessary information from the base station before the terminal enters the RRC_CONNECTED state, such as SIB2 reception, paging reception, and random access response message reception by using the CORESETs and SSs configured in SIB1. CORESET #0 2B-02 configured in MIB and CORESET #0 2B-06 configured in SIB1 may be different from each other, and the former is called a first CORESET #0 and the latter is called a second CORESET #0. SS #0 2B-03 configured in MIB and SS #0 2B-07 configured in SIB1 may be different from each other, and the former is referred to as a first SS #0 and the latter is referred to as a second SS #0. SS #0 and CORESET #0 configured for the RedCap terminal are referred to as a third SS #0 and a third CORESET #0. The first SS #0, the second SS #0, and the third SS #0 may be the same as or different from each other. The first CORESET #0, the second CORESET #0, and the third CORESET #0 may be the same as or different from each other. SS #0 and CORESET #0 are each indicated by a 4-bit index. The 4-bit index indicates a configuration predetermined in the standard specification. Except for SS #0 and CORESET #0, the detailed configuration of the remaining SS and CORSESET is indicated by each individual information element.

When the RRC connection is established, additional BWPs may be configured for the UE.

Figure 3A:
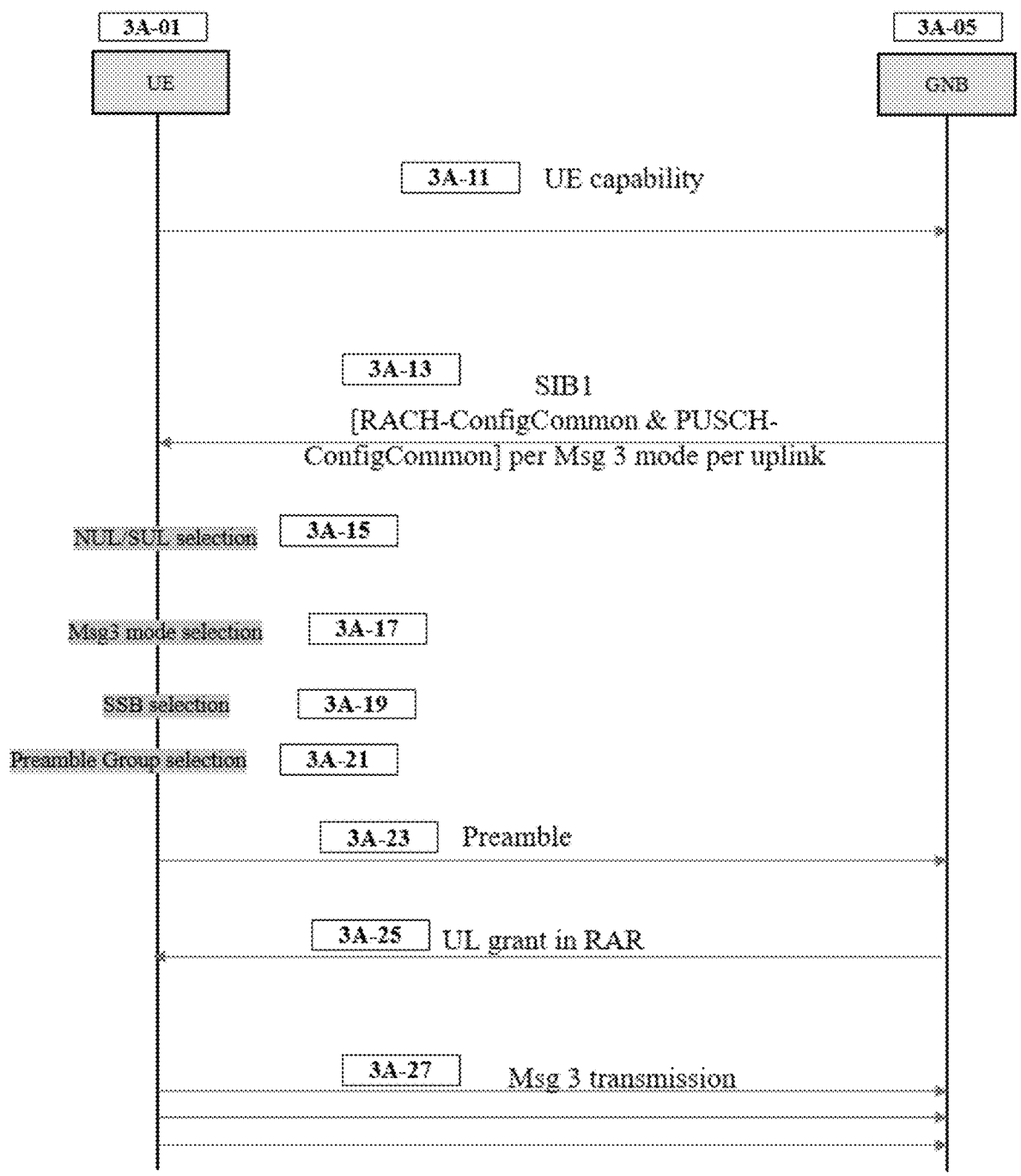
FIG. 3A is a diagram illustrating operations of a terminal and a base station according to an embodiment of the present invention.

FIG. 3A illustrates the operations of UE and GNB for random access procedure.

Random Access Preamble and preamble are used as same terminology.

In 3A-11, UE transmits to a GNB a UECapabilityInformation message. The message includes one or more frequency band specific capability information. Each band specific capability information includes band indicator and an indicator indicating whether the UE supports Msg 3 mode 2 or not.

In Msg 3 mode 1, UE transmits the Msg 3 without repetition. Retransmission of Msg 3 is performed based on DCI addressed by T C-RNTI or C-RNTI. In Msg 3 mode 2, UE transmits the Msg 3 repeatedly within a bundle. The number of repetitions is indicated in the uplink grant of RAR.

After sending the message, GNB may transit UE to RRC_IDLE.

UE performs cell selection and camps on a suitable cell.

In 3A-13, UE receives SIB1 in the suitable cell. GNB includes various information in the SIB1. SIB1 contains information relevant when evaluating if a UE is allowed to access a cell and defines the scheduling of other system information. It also contains radio resource configuration information that is common for all UEs. It also contains radio resource configuration information that is common for feature combinations.

More specifically, SIB1 contains a PDCCH-ConfigCommon and one or more random-access IE groups. A random-access IE group is included per uplink per Msg3 mode. SIB1 can include a random-access IE group for mode 1 of normal uplink, a random-access IE group for mode 2 of normal uplink, a random-access IE group for mode 1 of supplementary uplink and a random-access IE group for mode 2 of supplementary uplink.

Random-access IE group for mode 1 of normal uplink or of supplementary uplink includes RACH-ConfigCommon and PUSCH-ConfigCommon.

Random-access IE group for mode 2 of normal uplink or of supplementary uplink includes ra-SearchSpace, RACH-ConfigCommon and PUSCH-ConfigCommon. The ra-SearchSpace can be included in RACH-ConfigCommon.

To control the size of SIB1 in an acceptable level, Random-access IE group for mode 2 of normal uplink and Random-access IE group for mode 2 of supplementary uplink can be included in a new SIB instead of SIB1. SIB1 may include information indicating whether the new SIB is provided or not in the cell.

RACH-ConfigCommon is used to specify the cell specific random-access parameters and includes following IEs.

prach-ConfigurationIndex: An index indicating preamble format, SFN, subframe number, starting symbol, PRACH duration for PRACH preamble. It defines the time pattern of PRACH occasions and a preamble format which can be transmitted in the PRACH occasions.

msg1-FDM: The number of PRACH transmission occasions FDMed in one time instance.

msg1-FrequencyStart: Offset of lowest PRACH transmission occasion in frequency domain with respective to PRB 0.

preambleReceivedTargetPower: The target power level at the network receiver side. It is used to calculate preamble transmission power.

ra-Response Window: Msg2 (RAR) window length in number of slots.

messagePowerOffsetGroupB: Threshold for preamble selection.

numberOfRA-PreamblesGroupA: The number of CB preambles per SSB in group A.

ra-ContentionResolutionTimer: The initial value for the contention resolution timer.

ra-Msg3SizeGroupA: Transport Blocks size threshold in bits below which the UE shall use a contention-based RA preamble of group A.

rsrp-ThresholdSSB: UE may select the SS block and corresponding PRACH resource for path-loss estimation and (re)transmission based on SS blocks that satisfy the threshold.

rsrp-ThresholdSSB-SUL: The UE selects SUL carrier to perform random access based on this threshold.

rsrp-ThresholdMode: The UE selects Msg 3 repetition mode based on this threshold. It can be present in a RACH-ConfigCommon for mode 1 in NUL and a RACH-ConfigCommon for mode 1 in SUL. It is absent in a RACH-ConfigCommon for mode 2 in NUL and a RACH-ConfigCommon for mode 2 in SUL.

totalNumberOfRA-Preambles: Total number of preambles used for contention based and contention free 4-step or 2-step random access in the RACH resources defined in RACH-ConfigCommon, excluding preambles used for other purposes (e.g. for SI request).

PUSCH-ConfigCommon is used to configure the cell specific PUSCH parameters and includes following IEs.

msg3-DeltaPreamble: Power offset between msg3 and RACH preamble transmission.

pusch-TimeDomainAllocationList: List of time domain allocations for timing of UL assignment to UL data. This list is used for Mode 1.

pusch-TimeDomainAllocationList2: List of time domain allocations for timing of UL assignment to UL data. This list is used for Mode 2.

PUSCH-TimeDomainResourceAllocation is used to configure a time domain relation between PDCCH and PUSCH. PUSCH-TimeDomainResourceAllocationList contains one or more of such PUSCH-TimeDomainResourceAllocations. The network indicates in the UL grant which of the configured time domain allocations the UE shall apply for that UL grant. A PUSCH-TimeDomainResourceAllocation is associated with a k2 and startSymbolAndLength. k2 is the distance between PDCCH and PUSCH. startSymbolAndLength is an index giving valid combinations of start symbol and length.

The IE PUSCH-TimeDomainResourceAllocation2 is used to configure a time domain relation between PDCCH PUSCH. PUSCH-TimeDomainResourceAllocationList2 contains one or more of such PUSCH-TimeDomainResourceAllocation2s. The network indicates in the UL grant which of the configured time domain allocations the UE shall apply for that UL grant. A PUSCH-TimeDomainResourceAllocation2 is associated with a k2, startSymbol, length and numberOfRepetitions. startSymbol indicates the index of start symbol for PUSCH. length indicates the length allocated for PUSCH. numberOfRepetitions is number of repetitions.

PDCCH-ConfigCommon is used to configure cell specific PDCCH parameters includes following IEs.

commonControlResourceSet: An additional common control resource set which may be configured and used for any common or UE-specific search space.

commonSearchSpaceList: A list of additional common search spaces. If the network configures this field, it uses the SearchSpaceIds other than 0.

controlResourceSetZero: Parameters of the common CORESET #0 which can be used in any common or UE-specific search spaces.

pagingSearchSpace: ID of the Search space for paging.

ra-SearchSpace: ID of the Search space for random access procedure.

searchSpaceOtherSystemInformation: ID of the Search space for other system information, i.e., SIB2 and beyond.

searchSpaceZero: Parameters of the common SearchSpace #0.

After receiving the information, UE initiates random access procedure. Random access procedure can be initiated to establish RRC connection.

In 3A-15, UE selects, based on rsrp-ThresholdSSB-SUL indicated in the RACH-ConfigCommon for mode 1 of NUL, an uplink where random access procedure is to be performed.

If the RSRP of the downlink pathloss reference is less than rsrp-ThresholdSSB-SUL, UE select the NUL carrier for performing random access procedure.

If the RSRP of the downlink pathloss reference is greater than or equal to rsrp-ThresholdSSB-SUL, UE select the SUL carrier for performing random access procedure.

The downlink pathloss reference could be a SSB with the best RSRP among the SSBs of the cell. It could be any SSB of the cell.

UE could use, in selecting UL carrier, the rsrp-ThresholdSSB-SUL included in the first RACH-ConfigCommon of NUL. GNB may set the same values for the rsrp-ThresholdSSB-SULs included in RACH-ConfigCommon for mode 1 of SUL and the rsrp-ThresholdSSB-SUL included in RACH-ConfigCommon for mode 1 of NUL. GNB does not include rsrp-ThresholdSSB-SUL in RACH-ConfigCommon for mode 2 of NUL and in RACH-ConfigCommon for mode 2 of SUL.

In 3A-17, UE selects the mode based on the rsrp-ThresholdMod indicated in RACH-ConfigCommon for mode1 of NUL or based on the rsrp-ThresholdMod indicated in RACH-ConfigCommon for mode1 of SUL.

If NUL is selected and if at least one of the SSBs with SS-RSRP above rsrp-ThresholdMod, indicated in RACH-ConfigCommon for mode1 of NUL, is available, UE selects the mode 1. Alternatively, if NUL is selected and the average over SS-RSRPs of SSBs is higher than rsrp-ThresholdMod indicated in RACH-ConfigCommon for mode1 of NUL, UE selects mode 1.

If NUL is selected and if no SSB with SS-RSRP above rsrp-ThresholdMod, indicated in RACH-ConfigCommon for mode1 of NUL, is available, UE selects the mode 2. Alternatively, if NUL is selected and the average over SS-RSRPs of SSBs is lower than rsrp-ThresholdMod indicated in RACH-ConfigCommon for mode1 of NUL, UE selects mode 2.

If SUL is selected and if at least one of the SSBs with SS-RSRP above rsrp-ThresholdMod, indicated in RACH-ConfigCommon for mode1 of SUL, is available, UE selects the mode 1. Alternatively, if SUL is selected and the average over SS-RSRPs of SSBs is higher than rsrp-ThresholdMod indicated in RACH-ConfigCommon for mode1 of SUL, UE selects mode 1.

If SUL is selected and if no SSB with SS-RSRP above rsrp-ThresholdMod, indicated in RACH-ConfigCommon for mode1 of SUL, is available, UE selects the mode 2. Alternatively, if SUL is selected and the average over SS-RSRPs of SSBs is lower than rsrp-ThresholdMod indicated in RACH-ConfigCommon for mode1 of SUL, UE selects mode 2.

SS-RSRP (Synchronization Signal-reference signal received power) is defined as the linear average over the power contributions (in Watt) of the resource elements that carry SSS.

In 3A-19, UE selects a SSB based on a rsrp-ThresholdSSB.

If NUL and mode 1 are selected and if at least one of the SSBs with SS-RSRP above rsrp-ThresholdSSB, indicated in RACH-ConfigCommon for mode1 of NUL, is available, UE selects a SSB with SS-RSRP above rsrp-ThresholdSSB indicated in RACH-ConfigCommon for mode 1 of NUL.

If NUL and mode 2 are selected and if at least one of the SSBs with SS-RSRP above rsrp-ThresholdSSB, indicated in RACH-ConfigCommon for mode2 of NUL, is available, UE selects a SSB with SS-RSRP above rsrp-ThresholdSSB indicated in RACH-ConfigCommon for mode 2 of NUL.

If SUL and mode 1 are selected and if at least one of the SSBs with SS-RSRP above rsrp-ThresholdSSB, indicated in RACH-ConfigCommon for mode 1 of SUL, is available, UE selects a SSB with SS-RSRP above rsrp-ThresholdSSB indicated in RACH-ConfigCommon for mode 1 of SUL.

If SUL and mode 2 are selected and if at least one of the SSBs with SS-RSRP above rsrp-ThresholdSSB, indicated in RACH-ConfigCommon for mode2 of SUL, is available, UE selects a SSB with SS-RSRP above rsrp-ThresholdSSB indicated in RACH-ConfigCommon for mode 2 of SUL.

In 3A-21, UE selects preamble group based on the random-access IE groups received via SIB1.

64 preambles are defined in total. They can be divided into two groups. UE having large data and being in a good channel condition can select Preamble Group B so that GNB can allocate bigger UL grant. UE having smaller data or being in a bad channel condition can select Preamble Group A so that GNB can allocate normal UL grant.

If the potential Msg3 size (UL data available for transmission plus MAC subheader(s) and, where required, MAC CEs) is greater than ra-Msg3SizeGroupA and the pathloss is less than PCMAX (of the Serving Cell performing the Random Access Procedure) preambleReceivedTargetPower-msg3-DeltaPreamble messagePowerOffsetGroupB, UE select the Random Access Preamble group B.

If the Random Access procedure was initiated for the CCCH logical channel and the CCCH SDU size plus MAC subheader is greater than ra-Msg3SizeGroupA, UE selects the Random Access Preamble group B.

If the Random Access procedure was not initiated for the CCCH logical channel, and If the potential Msg3 size (UL data available for transmission plus MAC subheader(s) and, where required, MAC CEs) is not greater than ra-Msg3SizeGroupA, UE selects the Random Access Preamble group A.

If the Random Access procedure was initiated for the CCCH logical channel, and If the potential Msg3 size (UL data available for transmission plus MAC subheader(s) and, where required, MAC CEs) is not greater than ra-Msg3SizeGroupA, UE selects the Random Access Preamble group A.

If the Random Access procedure was not initiated for the CCCH logical channel, and If the potential Msg3 size (UL data available for transmission plus MAC subheader(s) and, where required, MAC CEs) is greater than ra-Msg3SizeGroupA, and the pathloss is not less than PCMAX (of the Serving Cell performing the Random Access Procedure)—preambleReceivedTargetPower-msg3-DeltaPreamble-messagePowerOffsetGroupB, UE select the Random Access Preamble group A.

If mode 1 in NUL is selected, UE uses msg3-DeltaPreamble included in PUSCH-ConfigCommon for mode 1 of NUL and uses Msg3SizeGroupA, preambleReceivedTargetPower and messagePowerOffsetGroupB included in RACH-ConfigCommon for mode 1 of NUL.

If msg3-DeltaPreamble is not provided in PUSCH-ConfigCommon for mode 1 of NUL, UE uses zero.

If mode 2 in NUL is selected, UE uses msg3-DeltaPreamble included in PUSCH-ConfigCommon for mode 2 of NUL and uses Msg3SizeGroupA, preambleReceivedTargetPower and messagePowerOffsetGroupB included in RACH-ConfigCommon for mode 2 of NUL.

If msg3-DeltaPreamble is not provided in PUSCH-ConfigCommon for mode 2 of NUL, UE uses msg3-DeltaPreamble provided in PUSCH-ConfigCommon for mode 1 or NUL.

If mode 1 in SUL is selected, UE uses msg3-DeltaPreamble included in PUSCH-ConfigCommon for mode 1 of SUL and uses Msg3SizeGroupA, preambleReceivedTargetPower and messagePowerOffsetGroupB included in RACH-ConfigCommon for mode 1 of SUL.

If msg3-DeltaPreamble is not provided in PUSCH-ConfigCommon for mode 1 of SUL, UE uses zero.

If mode 2 in SUL is selected, UE uses msg3-DeltaPreamble included in PUSCH-ConfigCommon for mode 2 of SUL and uses Msg3SizeGroupA, preambleReceivedTargetPower and messagePowerOffsetGroupB included in RACH-ConfigCommon for mode 2 of SUL.

If msg3-DeltaPreamble is not provided in PUSCH-ConfigCommon for mode 2 of SUL, UE uses msg3-DeltaPreamble provided in PUSCH-ConfigCommon for mode 1 or SUL.

UE select a preamble randomly with equal probability from the preambles associated with the selected SSB and the selected preamble group. UE sets the PREAMBLE_INDEX to a ra-PreambleIndex corresponding to the selected preamble.

UE determines the next available PRACH occasion from the PRACH occasions corresponding to the selected SSB. UE shall select a PRACH occasion randomly with equal probability amongst the consecutive PRACH occasions indicated by PRACH configuration index of RACH-ConfigCommon of the selected mode and the selected uplink.

In 3A-23, UE transmits the selected preamble in the selected PRACH occasion in the selected uplink.

UE sets PREAMBLE_RECEIVED_TARGET_POWER to preambleReceivedTargetPower+DELTA_PREAMBLE+(PREAMBLE_POWER_RAMPING_COUNTER−1)×powerRampingStep+POWER_OFFSET_2 STEP_RA.

UE sets the transmission power of the preamble to the sum of PREAMBLE_RECEIVED_TARGET_POWER and the pathloss.

If mode 1 in NUL is selected (or if mode 2 is not selected and NUL is selected), UE uses preambleReceivedTargetPower and powerRampingStep in RACH-ConfigCommon for mode 1 of NUL. UE sets POWER_OFFSET_2 STEP_RA to zero. UE sets DELTA_PREAMBLE according to the preamble format determined from prach-ConfigurationIndex indicated in RACH-ConfigCommon for mode 1 of NUL. DELTA_PREAMBLE is predefined each preamble format. PREAMBLE_POWER_RAMPING_COUNTER is initialized to 1 and incremented by 1 for each preamble transmission.

If mode 2 in NUL is selected, UE uses preambleReceivedTargetPower and powerRampingStep in RACH-ConfigCommon for mode 2 of NUL. UE sets POWER_OFFSET_2 STEP_RA to zero. UE sets DELTA_PREAMBLE according to the preamble format determined from prach-ConfigurationIndex indicated in RACH-ConfigCommon for mode 2 of NUL. DELTA_PREAMBLE is predefined for each preamble format. PREAMBLE_POWER_RAMPING_COUNTER is initialized to 1 and incremented by 1 for each preamble transmission.

If mode 1 in SUL is selected, UE uses preambleReceivedTargetPower and powerRampingStep in RACH-ConfigCommon for mode 1 of SUL. UE sets POWER_OFFSET_2 STEP_RA to zero. UE sets DELTA_PREAMBLE according to the preamble format determined from prach-ConfigurationIndex indicated in RACH-ConfigCommon for mode 1 of SUL. DELTA_PREAMBLE is predefined for each preamble format. PREAMBLE_POWER_RAMPING_COUNTER is initialized to 1 and incremented by 1 for each preamble transmission.

If mode 2 in SUL is selected, UE uses preambleReceivedTargetPower and powerRampingStep in RACH-ConfigCommon for mode 2 of SUL. UE sets POWER_OFFSET_2 STEP_RA to zero. UE sets DELTA_PREAMBLE according to the preamble format determined from prach-ConfigurationIndex indicated in RACH-ConfigCommon for mode 2 of SUL. DELTA_PREAMBLE is predefined for each preamble format. PREAMBLE_POWER_RAMPING_COUNTER is initialized to 1 and incremented by 1 for each preamble transmission.

In 3A-25, UE receives RAR including an uplink grant.

To receive RAR, UE start the ra-ResponseWindow configured by RACH-ConfigCommon at the first PDCCH occasion from the end of the Random Access Preamble transmission. UE monitors the PDCCH of the SpCell for Random Access Response(s) identified by the RA-RNTI while the ra-Response Window is running.

In monitoring PDCCH, UE applies searchSpace indicated by ra-SearchSpace.

If mode 1 in NUL or mode 1 in SUL is selected, ra-SearchSpace in PDCCH-ConfigCommon indicates the searchSpace UE should monitor for RAR reception.

If mode 2 in NUL is selected, ra-SearchSpace in RACH-ConfigCommon for mode 2 of NUL indicates the searchSpace UE should monitor for RAR reception.

If mode 2 in SUL is selected, ra-SearchSpace in RACH-ConfigCommon for mode 2 of SUL indicates the searchSpace UE should monitor for RAR reception. If ra-SearchSpace is not present in RACH-ConfigCommon for mode 2 of SUL, ra-SearchSpace in RACH-ConfigCommon for mode 2 of NUL is applied for RAR reception for mode 2 in SUL.

By configuring different ra-SearchSpaces for mode 1 and mode 2, GNB can ensure RAR for a mode is not received by UE operating in the other mode.

UE consider Random Access Response reception is successful if the Random Access Response contains a MAC subPDU with Random Access Preamble identifier corresponding to the transmitted PREAMBLE_INDEX.

The MAC subPDU contains a MAC RAR. The MAC RAR includes fields like Timing Advance Command, Uplink Grant and Temporary C-RNTI. The Timing Advance Command field indicates the index value used to control the amount of timing adjustment that the UE has to apply. The size of the Timing Advance Command field is 12 bits. The Uplink Grant field indicates the resources to be used on the uplink. The size of the UL Grant field is 27 bits. The Temporary C-RNTI field indicates the temporary identity that is used by the UE during Random Access. The size of the Temporary C-RNTI field is 16 bits Uplink Grant field further includes PUSCH time resource allocation field. PUSCH time resource allocation field is 4 bit.

This field indicates a TimeDomainAllocation of a TimeDomainAllocationList in PUSCH-ConfigCommon if mode 1 is selected (or UE transmitted preambles associated with mode 1) or a TimeDomainAllocation2 of a TimeDomainAllocationList2 in PUSCH-ConfigCommon if mode 2 is selected (or UE transmitted preambles associated with mode 2).

If mode 1 in NUL is selected and transmitted preamble is associated with mode 1 in NUL, TimeDomainAllocationList in PUSCH-ConfigCommon for mode 1 of NUL is used to determine time domain relation between PDCCH and PUSCH. In doing so, UE applies the TimeDomainAllocation indicated by PUSCH time resource allocation field of Uplink Grant.

If mode 1 in SUL is selected and transmitted preamble is associated with mode 1 in SUL, TimeDomainAllocationList in PUSCH-ConfigCommon for mode 1 of SUL is used to determine time domain relation between PDCCH and PUSCH. In doing so, UE applies the TimeDomainAllocation indicated by PUSCH time resource allocation field of Uplink Grant.

If mode 2 in NUL is selected and transmitted preamble is associated with mode 2 in NUL, TimeDomainAllocationList2 in PUSCH-ConfigCommon for mode 2 of NUL is used to determine number of repetition and time domain relation between PDCCH and PUSCH. In doing so, UE applies the TimeDomainAllocation2 indicated by PUSCH time resource allocation field of Uplink Grant.

If mode 2 in SUL is selected and transmitted preamble is associated with mode 2 in SUL, TimeDomainAllocationList2 in PUSCH-ConfigCommon for mode 2 of SUL is used to determine number of repetition and time domain relation between PDCCH and PUSCH. In doing so, UE applies the TimeDomainAllocation2 indicated by PUSCH time resource allocation field of Uplink Grant.

In 3A-27, UE performs Msg 3 transmission according to UL grant in the received RAR. UE generates a MAC PDU and trigger a new transmission. If mode 2 is applied and TimeDomainAllocationList2 is used, at most REPETITION_NUMBER-1 HARQ retransmission follows within a bundle after the first transmission in the bundle.

REPETITION_NUMBER is set to the number of repetitions associated with TimeDomainAllocation2 indicated by the uplink grant. Bundling operation relies on the HARQ entity for invoking the same HARQ process for each transmission that is part of the same bundle.

UE determines the PUSCH transmission power by summing offset 1, offset 2, pathloss and other parameters related with number of PRBs and power control commands.

offset 1 is sum of preambleReceivedTargetPower and msg3-DeltaPreamble.

offset2 is msg3-Alpha. two instances of msg3-Alpha can be provided: one for NUL and the other for SUL.

If mode 1 in NUL is selected, preambleReceivedTargetPower included in PRACH-ConfigCommon of mode 1 in NUL and msg3-DeltaPreamble included in PUSCH-2 ConfigCommon of mode 1 in NUL and msg3-Alpha for NUL are used. If msg3-Alpha for NUL is not provided, offset2 is 1.

If mode 1 in SUL is selected, preambleReceivedTargetPower included in PRACH-ConfigCommon of mode 1 in SUL and msg3-DeltaPreamble included in PUSCH-ConfigCommon of mode 1 in SUL and msg3-Alpha for SUL are used. If msg3-Alpha for SUL is not provided, offset2 is 1.

If mode 2 in NUL is selected, preambleReceivedTargetPower included in PRACH-ConfigCommon of mode 2 in NUL and msg3-DeltaPreamble included in PUSCH-ConfigCommon of mode 2 in NUL and msg3-Alpha for NUL are used. If msg3-Alpha for NUL is not provided, offset2 is 1.

If mode 2 in SUL is selected, preambleReceivedTargetPower included in PRACH-ConfigCommon of mode 2 in SUL and msg3-DeltaPreamble included in PUSCH-ConfigCommon of mode 2 in SUL and msg3-Alpha for SUL are used. If msg3-Alpha for SUL is not provided, offset2 is 1.

GNB receives the Msg 3 and process RRC message included in Msg 3. If RRC message requesting connection setup, GNB performs call admission control and act upon the result.

Figure 4A:
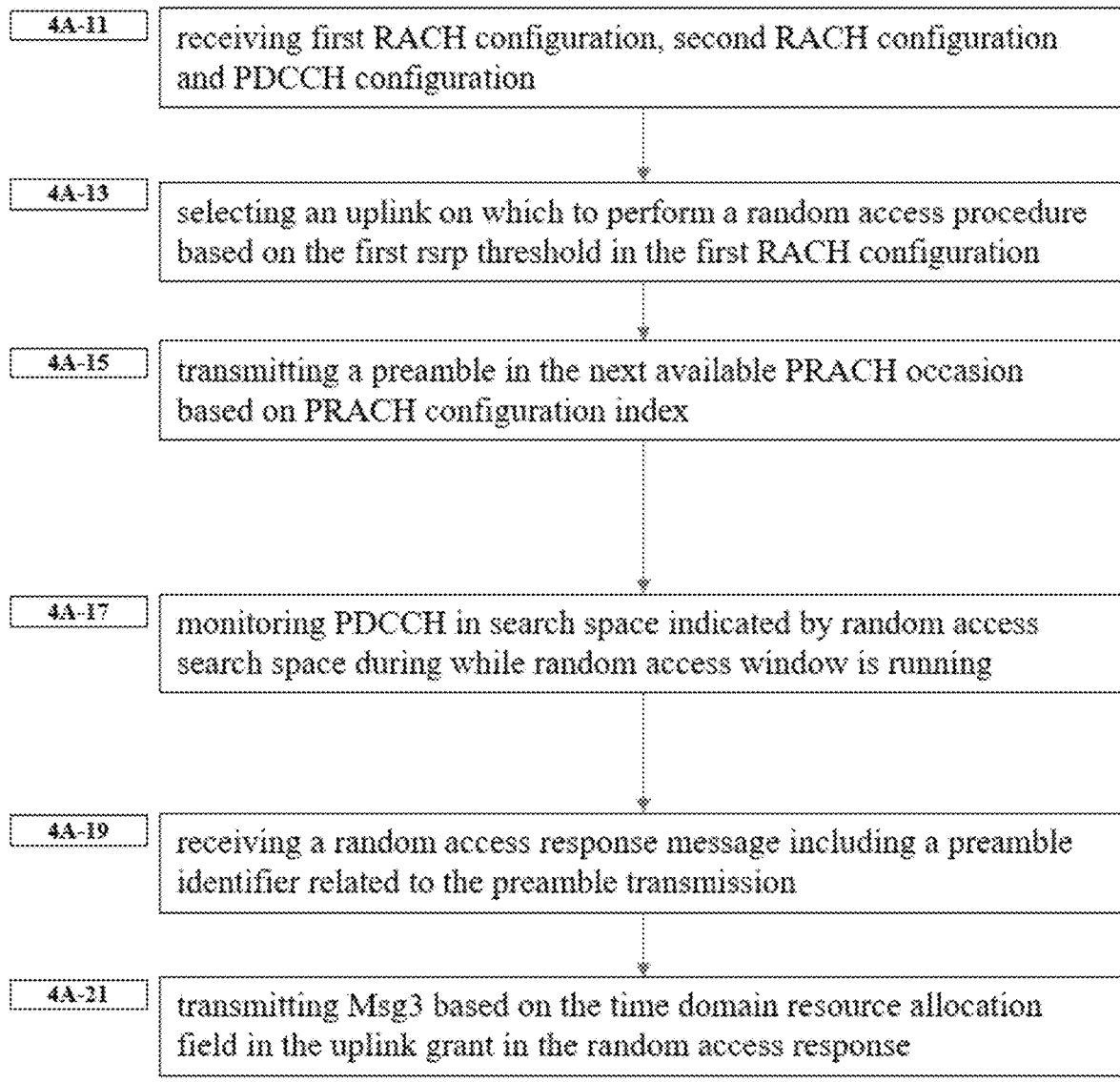
FIG. 4A is a flow diagram illustrating an operation of a terminal.

FIG. 4A illustrates the operation of the terminal.

In step 4A-11, the terminal receives first RACH configuration, second RACH configuration and PDCCH configuration.

In step 4A-13, the terminal selects an uplink on which to perform a random access procedure based on the first rsrp threshold in the first RACH configuration.

In step 4A-15, the terminal transmits a preamble in the next available PRACH occasion based on PRACH configuration index.

In step 4A-17, the terminal monitors PDCCH in search space indicated by random access search space during while random access window is running.

In step 4A-19, the terminal receives a random access response message including a preamble identifier related to the preamble transmission.

In step 4A-21, the terminal transmits Msg3 based on the time domain resource allocation field in the uplink grant in the random access response.

If the message 3 repetition mode is not selected, the random access response window of the first RACH configuration is used. If the message 3 repetition mode is selected, the random access response window of the second RACH configuration is used.

The random access search space of the second RACH configuration indicates one of the search space configurations included in the PDCCH configuration.

If message 3 repetition mode is not selected, the time resource allocation field indicates the time domain relationship between PDCCH and PUSCH. If message 3 repetition mode is selected, the time resource allocation field indicates the number of repetitions and time domain relationship between PDCCH and PUSCH.

A random access search space is included in the second RACH configuration.

If the message 3 repetition mode is not selected, the preamble transmission power is determined based on the preamble reception target power included in the first RACH configuration, the power ramping step, and the delta preamble determined in the PRACH configuration index included in the first RACH configuration.

If the message 3 repetition mode is selected, the preamble transmission power is determined based on the preamble reception target power and power ramping step included in the second RACH configuration and the delta preamble determined in the PRACH configuration index included in the second RACH configuration.

The first RACH configuration and the PDCCH configuration are included in the first SIB, and the second RACH configuration is included in the second SIB.

The first SIB includes information indicating whether a second SIB is provided.

An uplink carrier for performing a random access procedure is selected based on the first rsrp threshold included in the first RACH configuration.

If the message 3 repetition mode is not selected, the PRACH configuration index included in the first RACH configuration is used, and if the message 3 repetition mode is selected, the PRACH configuration index included in the second RACH configuration is used.

4B illustrates the operation of a base station.

In step 4B-11, the base station transmits first RACH configuration, second RACH configuration and PDCCH configuration.

In step 4B-13, the base station receives a preamble.

In step 4B-15, the base station determines a mode related to the preamble and determines an uplink transmission resource according to the determined mode.

In step 4B-17, the base station transmits a random access response message including the uplink transmission resource.

The random access response window of the first RACH setting is set for terminals not selecting the message 3 repetition mode, and the random access response window of the second RACH setting is set for the terminals selecting the message 3 repetition mode.

The random access search space of the second RACH configuration is set to indicate one of the search space configurations included in the PDCCH configuration.

For a UE that does not select the message 3 repetition mode, the time resource allocation field is set to indicate the time domain relationship between the PDCCH and the PUSCH. For a UE in which message 3 repetition mode is selected, the time resource allocation field is set to indicate the number of repetitions and the time domain relationship between PDCCH and PUSCH.

A random access search space is included in the second RACH configuration.

The first RACH configuration and the PDCCH configuration are included in the first SIB, and the second RACH configuration is included in the second SIB.

Information indicating whether a second SIB is provided is included in the first SIB.

For UEs that have not selected the message 3 repetition mode, a PRACH configuration index included in the first RACH configuration is set, and for UEs that have selected the message 3 repetition mode, a PRACH configuration index included in the second RACH configuration is configured.

Figure 5A:
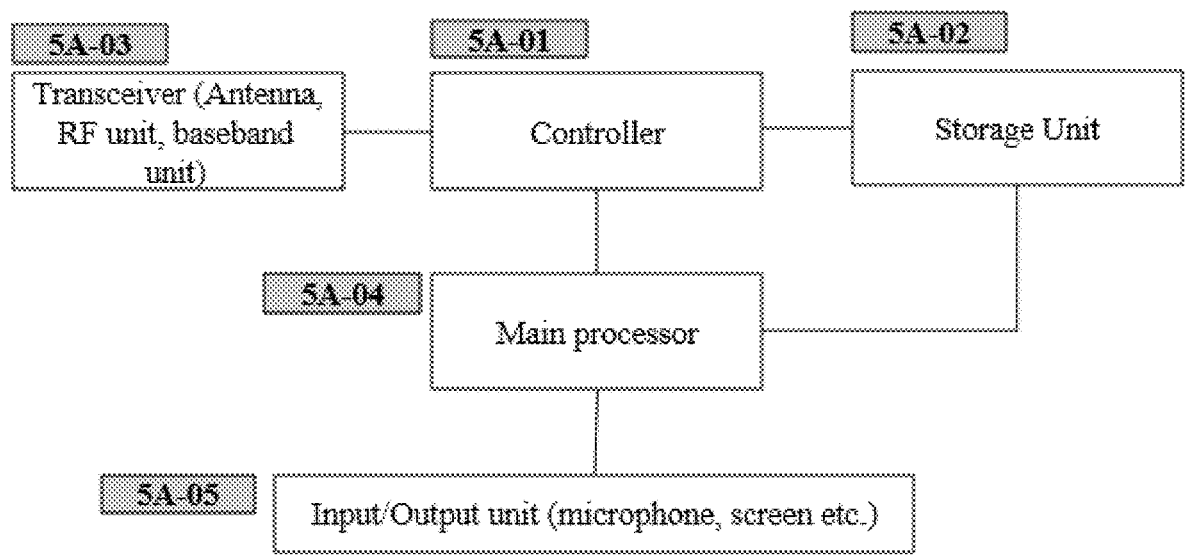
FIG. 5A is a block diagram illustrating the internal structure of a UE to which the disclosure is applied.

FIG. 5A is a block diagram illustrating the internal structure of a UE to which the disclosure is applied.

Referring to the diagram, the UE includes a controller 5A-01, a storage unit 5A-02, a transceiver 5A-03, a main processor 5A-04 and I/O unit 5A-05.

The controller 5A-01 controls the overall operations of the UE in terms of mobile communication. For example, the controller 5A-01 receives/transmits signals through the transceiver 5A-03. In addition, the controller 5A-01 records and reads data in the storage unit 5A-02. To this end, the controller 5A-01 includes at least one processor. For example, the controller 5A-01 may include a communication processor (CP) that performs control for communication and an application processor (AP) that controls the upper layer, such as an application program. The controller controls storage unit and transceiver such that UE operations illustrated in FIG. 3A and FIG. 4A are performed.

The storage unit 5A-02 stores data for operation of the UE, such as a basic program, an application program, and configuration information. The storage unit 5A-02 provides stored data at a request of the controller 5A-01.

The transceiver 5A-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down—converts an RF band signal received through the antenna into a baseband signal. The RF processor may include a transmission filter, a reception filter, an amplifier, a mi10r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 5A-04 controls the overall operations other than mobile operation. The main processor 5A-04 process user input received from I/O unit 5A-05, stores data in the storage unit 5A-02, controls the controller 5A-01 for required mobile communication operations and forward user data to I/O unit 5A-05.

I/O unit 5A-05 consists of equipment for inputting user data and for outputting user data such as a microphone and a screen. I/O unit 5A-05 performs inputting and outputting user data based on the main processor's instruction.

Figure 5B:
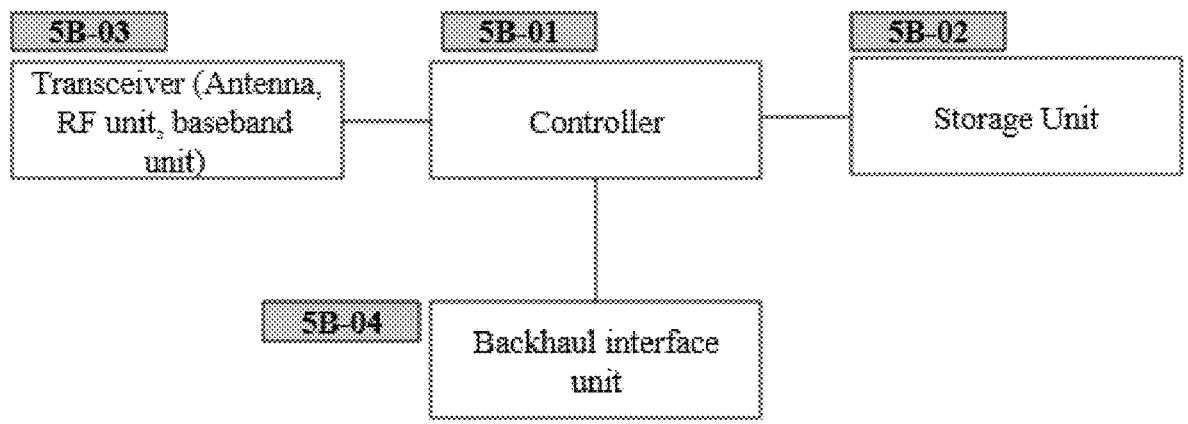
FIG. 5B is a block diagram illustrating the configuration of a base station according to the disclosure.

FIG. 5B is a block diagram illustrating the configuration of a base station according to the disclosure.

As illustrated in the diagram, the base station includes a controller 5B-01, a storage unit 5B-02, a transceiver 5B-03 and a backhaul interface unit 5B-04.

Figure 4B:
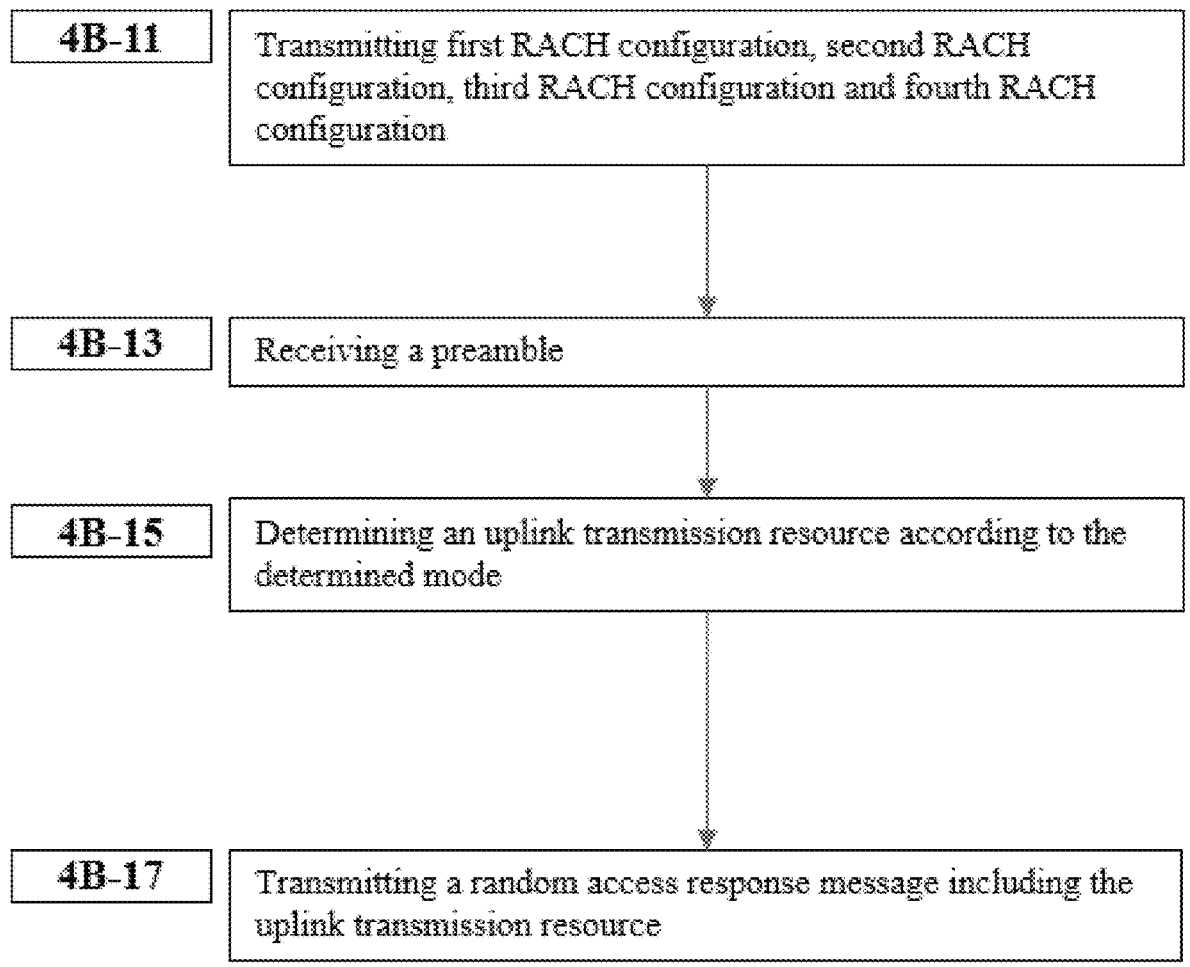
FIG. 4B is a flow diagram illustrating an operation of a base station.

The controller 5B-01 controls the overall operations of the main base station. For example, the controller 5B-01 receives/transmits signals through the transceiver 5B-03, or through the backhaul interface unit 5B-04. In addition, the controller 5B-01 records and reads data in the storage unit 5B-02. To this end, the controller 5B-01 may include at least one processor. The controller controls transceiver, storage unit and backhaul interface such that base station operation illustrated in FIG. 3A and FIG. 4B are performed.

The storage unit 5B-02 stores data for operation of the main base station, such as a basic program, an application program, and configuration information. Particularly, the storage unit 5B-02 may store information regarding a bearer allocated to an accessed UE, a measurement result reported from the accessed UE, and the like. In addition, the storage unit 5B-02 may store information serving as a criterion to deter mine whether to provide the UE with multi-connection or to discontinue the same. In addition, the storage unit 5B-02 provides stored data at a request of the controller 5B-01.

The transceiver 5B-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down—converts an RF band signal received through the antenna into a baseband signal. The RF processor may include a transmission filter, a reception filter, an amplifier, a mi10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 5B-04 provides an interface for communicating with other nodes inside the network. The backhaul interface unit 5B-04 converts a bit string transmitted from the base station to another node, for example, another base station or a core network, into a physical signal, and converts a physical signal received from the other node into a bit string.

What is claimed is:

1. A method performed by a wireless device, the method comprising:
receiving system information of a cell, wherein the system information comprises a plurality of configuration parameters associated with random access, and wherein the plurality of configuration parameters associated with random access comprises:
   a first configuration parameter of normal uplink, wherein the first configuration parameter of the normal uplink comprises a first power offset, wherein the first configuration parameter of the normal uplink comprises at least one parameter of a first RACH-ConfigCommon for the normal uplink;
   a second configuration parameter of the normal uplink, wherein the second configuration parameter of the normal uplink does not comprise a second power offset, wherein the second configuration parameter of the normal uplink comprises at least one parameter of a second RACH-ConfigCommon for the normal uplink;
   a first configuration parameter of supplementary uplink; and
   a second configuration parameter of the supplementary uplink;
   selecting, based on a first reference signal received power (RSRP) threshold, a normal uplink (NUL) carrier for performing random access;
   determining, based on a second RSRP threshold, an uplink transmission repetition for the random access;
   based on the second power offset not configured in the second configuration parameter of the normal uplink, selecting, based on a preamble power parameter of the second configuration parameter of the normal uplink and based on the first power offset of the first configuration parameter of the normal uplink, a preamble group; and
   transmitting, based on the preamble power parameter of the second configuration parameter of the normal uplink, a random access preamble.

2. The method of claim 1, wherein the system information further indicates:
   the second RSRP threshold, configured in the first configuration parameter of the normal uplink, for determining whether to apply message 3 (Msg3) repetition for the normal uplink.

3. The method of claim 2, wherein the system information further indicates:
   a third RSRP threshold, configured in the first configuration parameter of the supplementary uplink, for determining whether to apply Msg3 repetition for the supplementary uplink.

4. The method of claim 1, wherein:
   the first configuration parameter of the normal uplink comprises a first rsrp-ThresholdSSB parameter for synchronization signal block (SSB) selection;
   the second configuration parameter of the normal uplink comprises a second rsrp-ThresholdSSB parameter for SSB selection;
   the first configuration parameter of the supplementary uplink comprises a third rsrp-ThresholdSSB parameter for SSB selection; and
   the second configuration parameter of the supplementary uplink comprises a fourth rsrp-ThresholdSSB parameter for SSB selection.

5. The method of claim 4, further comprising:
   selecting, based on the second rsrp-ThresholdSSB parameter of the second configuration parameter of the normal uplink, an SSB.

6. The method of claim 1, wherein:
   the first power offset is a first delta preamble parameter configurable in the first configuration parameter of the normal uplink; and
   the second power offset is a second delta preamble parameter configurable in the second configuration parameter of the normal uplink.

7. The method of claim 6, wherein the preamble power parameter of the second configuration parameter of the normal uplink is a preamble received target power parameter of the second configuration parameter of the normal uplink.

8. The method of claim 6, wherein the first delta preamble parameter is a msg3-DeltaPreamble configured in a PUSCH-ConfigCommon for the normal uplink.

9. The method of claim 6, wherein the first RSRP threshold is present in the first configuration parameter of the normal uplink, and wherein the first RSRP threshold is absent in the second configuration parameter of the normal uplink.

10. The method of claim 1, wherein:
   the second configuration parameter of the normal uplink comprises a random access configuration for message 3 (Msg3) repetition on the normal uplink;
   the second configuration parameter of the supplementary uplink comprises a random access configuration for Msg3 repetition on the supplementary uplink; and
   the determined uplink transmission repetition for the random access comprises Msg3 repetition for the random access.

11. The method of claim 1, wherein the first configuration parameter of the normal uplink comprises at least one parameter of a RACH-ConfigCommon for the normal uplink and at least one parameter of a PUSCH-ConfigCommon for the normal uplink, and
   wherein the first configuration parameter of the supplementary uplink comprises at least one parameter of a RACH-ConfigCommon for the supplementary uplink and at least one parameter of a PUSCH-ConfigCommon for the supplementary uplink.

12. The method of claim 1, further comprising:
   repeatedly performing, based on a number of repetitions for an uplink transmission scheduled by an uplink grant of a random access response (RAR), the uplink transmission.

13. The method of claim 1, wherein the random access corresponds to a four-step random access procedure configured for the NUL carrier, and
   wherein the system information comprises system information block 1 (SIB1).

14. The method of claim 1, wherein the second configuration parameter of the normal uplink further comprises a prach-ConfigurationIndex, and
   wherein the transmitting the random access preamble is further based on a power offset value associated with the prach-ConfigurationIndex of the second configuration parameter of the normal uplink.

15. The method of claim 14, wherein the power offset value is a DELTA_PREAMBLE value corresponding to a preamble format of the prach-ConfigurationIndex of the second configuration parameter of the normal uplink.

16. The method of claim 1, wherein the preamble power parameter of the second configuration parameter of the normal uplink comprises:
   a preamble received target power parameter of the second configuration parameter of the normal uplink.

17. The method of claim 16, further comprising:
   performing, based on the preamble received target power parameter of the second configuration parameter of the normal uplink and based on the first power offset of the first configuration parameter of the normal uplink, an uplink transmission scheduled by an uplink grant of a random access response.

\* \* \* \* \*